UNITED STATES PATENT OFFICE.

ELIJAH S. McCAUGHEY, OF SIOUX CITY, IOWA.

PAVING COMPOSITION.

SPECIFICATION forming part of Letters Patent No. 398,421, dated February 26, 1889.

Application filed October 19, 1888. Serial No. 288,612. (No specimens.)

*To all whom it may concern:*

Be it known that I, ELIJAH S. McCAUGHEY, of Sioux City, in the county of Woodbury and State of Iowa, have invented certain new and useful Improvements in Paving Compositions; and I do hereby declare the following to be a full, clear, and exact description of the invention, such as will enable others skilled in the art to which it pertains to make and use the same.

My invention relates to an improvement in the compositions employed in the manufacture of brick and in a novel manner of laying the same for streets, sidewalks, &c.

The primary object of the invention is to provide a brick which shall be comparatively cheap to manufacture, impervious to moisture, not affected by heat or cold, and thoroughly durable in use.

The invention consists in the composition hereinafter specified and claimed.

The invention further consists in the improved manner of laying the brick, as will be more fully described.

The composition consists of clay and sand mixed, preferably in equal quantities, to which is added carbonate of lime and silica in required proportions, and the mass is then puddled, after which it is pressed in suitable quantities into brick form and then subjected to the usual methods of manufacturing ordinary brick.

In certain sections of the country the sand contains sufficient silica and the clay sufficient carbonate of lime, so that their addition to the clay and sand is not necessary. In some localities the clay may contain sufficient carbonate of lime and the sand not enough silica, in which event the latter is added, while in other localities the sand may have the silica in the required degree and the clay be without carbonate of lime, so that its addition will be necessary. It will therefore be understood that my composition comprehends the presence of carbonate of lime and silica in the clay and sand, or their addition in required quantities. In burning the molded brick made from the above composition silicic acid is formed by the heat to which the silica and carbonate of lime are subjected, and vitrifaction is therefore quickly effected.

In laying the before-described brick the road-bed is first rolled with a heavy roller to give it the usual oval form from curb to curb, so that water will be readily shed from it and carried off. A layer of sand about two inches thick is then spread upon the bed and thoroughly rolled. The first tier of brick is then laid flat and lengthwise the street. The first tier of brick is then covered with about an inch of sand and rolled smooth, after which the second tier of brick is laid on edge running crosswise the street. The surface is then covered with sand, thus filling all the interstices and leaving a body of sand on the surface, after which the roller is again applied.

A road, alley, or sidewalk laid as described is thoroughly durable, and may be readily repaired without disturbing any other part than that affected.

Having thus fully described my invention, what I claim, and desire to secure by Letters Patent, is—

The herein-described composition for brick, consisting of clay, sand, carbonate of lime, and silica, substantially as hereinbefore set forth.

In testimony whereof I have signed this specification in the presence of two subscribing witnesses.

ELIJAH S. McCAUGHEY.

Witnesses:
LEIGHTON WYNN,
S. W. APPLETON.